United States Patent
Laine et al.

(10) Patent No.: US 11,743,972 B2
(45) Date of Patent: Aug. 29, 2023

(54) SYSTEM AND METHOD FOR GENERATING AND COLLECTING VIBRATION DATA WITH A VIEW TO MONITORING A STRUCTURE

(71) Applicant: SERCEL, Carquefou (FR)

(72) Inventors: Jérôme Laine, Carquefou (FR); Hervé Delacourt, Carquefou (FR); Nicolas Audonnet, Carquefou (FR)

(73) Assignee: SERCEL, Carquefou (FR)

( * ) Notice: Subject to any disclaimer, the term of this patent is extended or adjusted under 35 U.S.C. 154(b) by 122 days.

(21) Appl. No.: 17/498,359

(22) Filed: Oct. 11, 2021

(65) Prior Publication Data

US 2022/0117039 A1    Apr. 14, 2022

(30) Foreign Application Priority Data

Oct. 12, 2020 (FR) .................................. 20 10409

(51) Int. Cl.

| | |
|---|---|
| *H04W 88/16* | (2009.01) |
| *H04L 67/025* | (2022.01) |
| *H04L 67/12* | (2022.01) |
| *H04L 69/08* | (2022.01) |
| *H04W 80/00* | (2009.01) |

(Continued)

(52) U.S. Cl.
CPC .......... *H04W 88/16* (2013.01); *H04L 67/025* (2013.01); *H04L 67/12* (2013.01); *H04L 69/08* (2013.01);
(Continued)

(58) Field of Classification Search
CPC ..... H04W 88/00; H04W 88/18; H04W 88/16; H04W 4/38; H04W 84/00;
(Continued)

(56) References Cited

U.S. PATENT DOCUMENTS

| | | | | |
|---|---|---|---|---|
| 2012/0146802 A1* | 6/2012 | Abercrombie | ...... | G01M 5/0066 340/669 |
| 2014/0047284 A1* | 2/2014 | Masleid | ................. | G11C 29/32 714/E11.159 |

(Continued)

FOREIGN PATENT DOCUMENTS

| | | | | |
|---|---|---|---|---|
| CN | 111397725 | * | 7/2020 | ............. G01H 47/00 |
| CN | 114719958 | * | 7/2022 | ............. G01H 11/08 |

(Continued)

OTHER PUBLICATIONS

International Search Report dated Jun. 22, 2021.
Search Report dated Oct. 12, 2020.

*Primary Examiner* — Warner Wong
(74) *Attorney, Agent, or Firm* — IPSilon USA, LLP

(57) ABSTRACT

The invention relates to a system for generating and collecting data with a view to determining the state of a structure (100). The system comprises a system (1) for acquiring vibration signals and a communication gateway system (2, 2') configured to receive a signal (TL21, TL21rvl) from the gateway system (2, 2'), using a first protocol, and when the signal (TL21rvl) comprises a wake-up instruction, send the gateway system (2, 2') an activity instruction request signal (TW12) using a second protocol, receive, from the gateway system (2, 2'), using the second protocol, an activity instruction signal (TW21) comprising an acquisition instruction, trigger a vibration signal acquisition operation and generate vibration data (Dvib) on the basis of the vibration signals acquired; and transmit, using the second protocol, the vibration data (Dvib) to the gateway system (2, 2'). The invention also relates to the acquisition system and to the corresponding gateway system, and to a corresponding method.

20 Claims, 5 Drawing Sheets

(51) Int. Cl.
*H04W 4/38* (2018.01)
*H04W 84/18* (2009.01)

(52) U.S. Cl.
CPC .............. *H04W 4/38* (2018.02); *H04W 80/00* (2013.01); *H04W 84/18* (2013.01)

(58) Field of Classification Search
CPC .. H04W 80/00–12; H04L 67/01; H04L 67/02; H04L 67/025; H04L 69/00; H04L 67/12; G01M 5/0008; H04B 2203/5458
See application file for complete search history.

(56) References Cited

U.S. PATENT DOCUMENTS

| | | | |
|---|---|---|---|
| 2016/0241999 A1* | 8/2016 | Chin | G07C 9/00182 |
| 2017/0184471 A1* | 6/2017 | Kobayashi | G01M 5/0008 |
| 2017/0184550 A1* | 6/2017 | Kobayashi | G01P 3/64 |
| 2017/0363504 A1* | 12/2017 | Winant | G01M 5/0066 |
| 2018/0049127 A1 | 2/2018 | Hu et al. | |
| 2018/0149516 A1 | 5/2018 | Wascat et al. | |
| 2020/0175852 A1* | 6/2020 | Yamashita | H04L 67/52 |
| 2022/0074808 A1* | 3/2022 | Zhou | G01M 5/0008 |
| 2022/0210715 A1* | 6/2022 | Deixler | H04W 40/02 |
| 2022/0261511 A1* | 8/2022 | Umekawa | G01M 5/0008 |

FOREIGN PATENT DOCUMENTS

| | | | | |
|---|---|---|---|---|
| DE | 102019215821 | * | 4/2021 | ......... G01M 5/0008 |
| IT | WO 2019159042 | * | 8/2019 | ......... G01G 19/024 |
| KR | 2019 0000006 | | 1/2019 | |
| NL | 2 022 301 | | 7/2020 | |
| WO | 2020/061620 | | 4/2020 | |

\* cited by examiner

SYSTEM AND METHOD FOR GENERATING AND COLLECTING VIBRATION DATA WITH A VIEW TO MONITORING A STRUCTURE

RELATED APPLICATION

This application claims the benefit of priority from French Patent Application No. 20 10409, filed on Oct. 12, 2020, the entirety of which is incorporated by reference.

FIELD OF THE INVENTION

The present invention generally relates to the generation and collection of data with a view to monitoring the state of a structure, such as a bridge.

PRIOR ART

It is useful to be able to monitor the state of a structure, such as a bridge, in order to anticipate a deterioration in said structure and to be able to carry out maintenance work while there is still time.

A conventional evaluation method for monitoring the state of a structure consists in visually inspecting the structure in order to search for and quantify the progress of cracks. However, this method allows only visible defects on the structure to be monitored, such that such a method does not make it possible to monitor the change in the state of the structure reliably and to anticipate maintenance.

It is also possible to monitor the state of a structure such as a bridge by incorporating strain gauges into the structure of the bridge. However, such incorporation of strain gauges has to be anticipated in the design phase of the bridge, and cannot be implemented on an existing bridge.

Document WO2020061620 describes a utility pole monitoring device comprising: a body adapted to be coupled to a utility pole, a vibration device arranged on the body and configured to generate vibrations on or in the utility pole, a sensor arranged on the body for measuring the vibrations within the utility pole generated by the vibration device, and a controller for providing an initialization signal to the vibration device, and for receiving measured data from the sensor.

An object of the present invention is to propose a novel system and method for collecting data with a view to monitoring the state of a structure, allowing all or some of the problems set out above to be overcome.

SUMMARY OF THE INVENTION

According to one embodiment, what is proposed is a system for generating and collecting data with a view to determining the state of a structure, such as a bridge, wherein the system for generating and collecting data comprises:

an acquisition system comprising devices for acquiring vibration signals, referred to as nodes, said nodes being suitable for being distributed at multiple locations on the structure, said nodes being configured to acquire vibration signals and generate vibration data relating to the vibration signals acquired;

a communication gateway system configured to communicate with the acquisition system using a first radiocommunication protocol, preferably the LoRaWAN protocol, in order to transmit a signal to the acquisition system; and to communicate with the acquisition system using a second radiocommunication protocol, distinct from the first protocol, preferably a Wi-Fi-type protocol, in order to collect the vibration data generated by the acquisition system;

and the acquisition system is configured to:
receive the signal from the gateway system, using the first protocol, and
when the signal comprises a wake-up instruction,
send the gateway system an activity instruction request signal using the second protocol,
receive, from the gateway system, using the second protocol, an activity instruction signal comprising an acquisition instruction,
trigger a vibration signal acquisition operation and generate vibration data on the basis of the vibration signals acquired; and
transmit, using the second protocol, the vibration data to the gateway system.

Also proposed is a method for generating and collecting data with a view to determining the state of a structure, such as a bridge, using an acquisition system and a gateway system, said acquisition system comprising devices for acquiring vibration signals, referred to as nodes, said nodes being distributed at multiple locations on the structure, said nodes being configured to acquire vibration signals and to generate vibration data relating to the vibration signals acquired, wherein the method comprises the following steps:

the acquisition system receiving, using a first radiocommunication protocol, a signal from the gateway system comprising a wake-up instruction,
the acquisition system transmitting an activity instruction request signal to the gateway system using a second radiocommunication protocol;
the acquisition system receiving, using the second radiocommunication protocol, an activity instruction comprising an acquisition instruction from the gateway system;
the acquisition system triggering the acquisition of vibration signals, and generating vibration data on the basis of the vibration signals acquired; and
the acquisition system transmitting, to the gateway system via the acquisition system, using the second radiocommunication protocol, the vibration data generated.

Also proposed is a method for generating and collecting data with a view to determining the state of a structure, such as a bridge, using an acquisition system and a gateway system, wherein the steps of the method are steps implemented by the gateway system and/or the acquisition system and/or the server system.

Optionally, the gateway system transmits, to a remote server system, the vibration data received from the acquisition system.

Optionally, the remote server system executes a program for the operational modal analysis of the structure on the basis of the vibration data received and generates, according to the results of the operational modal analysis, information relating to the state of the structure.

Also proposed is a non-transient computer program product comprising program code instructions for executing the steps of a method as described above, when said program is executed by a processor of a node of the acquisition system.

Also proposed is a non-transient computer program product comprising program code instructions for executing the steps of a method for generating and collecting data with a view to determining the state of a structure, such as a bridge, using an acquisition system and a gateway system, when said program is executed by a processor of a node of the acquisition system as described above and/or by a processor of a gateway system as described above.

Also proposed is a device for acquiring vibration signals, referred to as a node, said node being suitable for being positioned at a location on a structure, such as a bridge, the node being configured to acquire vibration signals and generate vibration data relating to the vibration signals acquired, wherein the node comprises a first radiocommunication module allowing communication with a gateway system, for example as proposed above, using a first radiocommunication protocol, preferably the LoRaWAN protocol, in order to receive a signal; and a second radiocommunication module for communication with the gateway system using a second radiocommunication protocol, distinct from the first radiocommunication protocol, preferably a Wi-Fi-type protocol, in order to transmit, to the gateway system, the vibration data generated by the acquisition system;

and the node is configured to:

when the signal received using the first radiocommunication protocol comprises a wake-up instruction, send the gateway system an activity instruction request signal using the second radiocommunication protocol;

receive, from the gateway system, using the second radiocommunication protocol, an activity instruction signal comprising an acquisition instruction;

trigger a vibration signal acquisition operation and generate vibration data on the basis of the vibration signals acquired; and transmit the vibration data to the gateway system using the second radiocommunication protocol.

Also proposed is a communication gateway system for collecting vibration data generated by an acquisition system, for example as proposed above, with a view to determining the state of a structure, such as a bridge, wherein the communication gateway system comprises a first radiocommunication module allowing communication with the acquisition system using a first radiocommunication protocol, preferably the LoRaWAN protocol, in order to transmit a signal to the acquisition system; and a second radiocommunication module allowing communication with the acquisition system using a second radiocommunication protocol, distinct from the first radiocommunication protocol, preferably a Wi-Fi-type protocol, in order to collect the vibration data generated by the acquisition system;

and the communication gateway system is configured to:

transmit, using the first radiocommunication protocol, a signal that comprises a wake-up instruction;

receive, from the acquisition system, an activity instruction request signal using the second radiocommunication protocol;

transmit, using the second radiocommunication protocol, an activity instruction signal comprising an acquisition instruction, so that the acquisition system triggers a vibration signal acquisition operation and generates vibration data on the basis of the vibration signals acquired;

receive said vibration data using the second radiocommunication protocol;

preferably, transmit the vibration data received to a remote server system, for example as proposed above.

BRIEF DESCRIPTION OF THE DRAWINGS

Other features and advantages of the invention will become more apparent from the following description, which is purely illustrative and non-limiting and should be read in conjunction with the appended drawings, in which.

DETAILED DESCRIPTION

Figure 1:
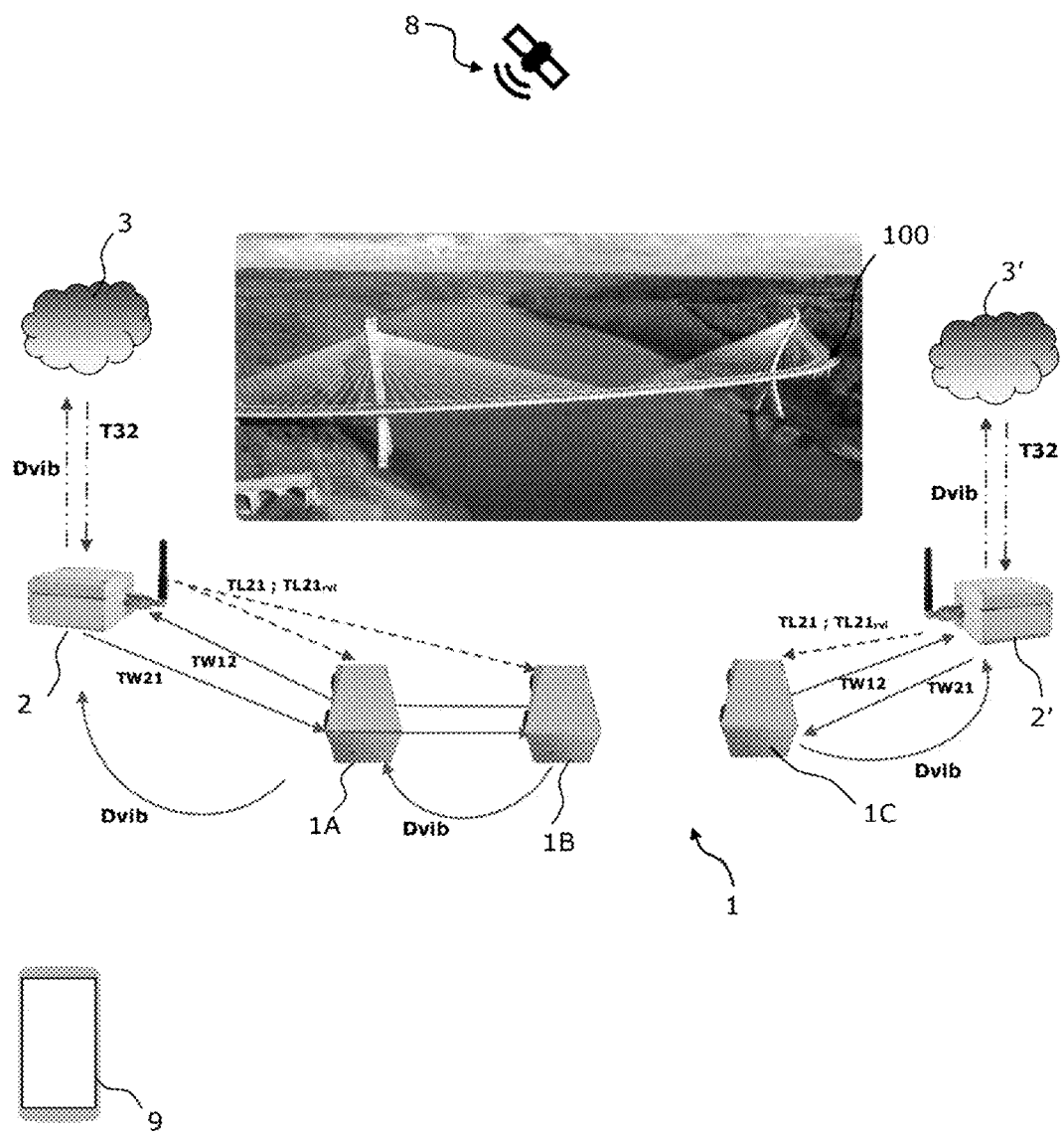
FIG. 1 is a schematic view of a system for generating and collecting data according to one embodiment of the invention.

The concept of the invention is described in more detail below with reference to the appended drawings, which show embodiments of the concept of the invention. In the drawings, the size and the relative sizes of the elements may be exaggerated for the sake of clarity. Similar numbers refer to similar elements throughout the drawings. However, this concept of the invention may be implemented in many different forms and should not be interpreted as being limited to the embodiments disclosed here. Instead, these embodiments are provided such that this description is complete, and communicate the scope of the concept of the invention to those skilled in the art.

Reference throughout the specification to "an/one embodiment" means that a particular functionality, structure or feature described in connection with an embodiment is included in at least one embodiment of the present invention. Thus, the occurrence of the expression "in one embodiment" in various places throughout the specification does not necessarily refer to the same embodiment. Furthermore, the particular functionalities, structures or features may be combined in any suitable manner in one or more embodiments.

With reference to the figures, what is shown is a system for generating and collecting data with a view to determining the state of a structure, such as a bridge. The design of said system makes it possible to benefit from reliable operation while having low energy consumption. The data collected make it possible to verify the reliability of the state of the structure in order to anticipate its maintenance and/or prevent a risk of collapse.

Structure to be Monitored

In the example illustrated in the figures and more particularly in FIG. 1, the structure 100 to be monitored is a road bridge over which vehicles, such as cars or lorries, are intended to travel. The structure to be monitored may also be a footbridge or a rail bridge. The structure to be monitored may also conceivably be another type of civil engineering structure, for example a tunnel, a dyke, a wharf, a dam, a lock, or a retaining wall, a harbour or any harbour infrastructure. More generally, the invention may be applied to any work of civil engineering, airport, water tower, or industrial building (factory, warehouse, hangar, power station, etc.), or residential building (in particular skyscrapers and towers), or stadium.

The structure 100 may be an item of "heavy" industrial equipment, such as a gantry crane, or an item of equipment such as an antenna or a utility pole, or an offshore structure such as a rig or a wind turbine, whether floating or anchored to the seabed. Certain ships or barges may also benefit from the monitoring system according to the invention, this list not being exhaustive.

Acquisition System

As illustrated in FIG. 1, the system for generating and collecting data includes an acquisition system 1 which comprises a plurality of vibration signal acquisition devices 1A, 1B, 1C. Hereinafter, each vibration signal acquisition device is referred to as a node. The acquisition system 1 makes it possible to generate vibration data and to transmit them to a gateway system 2, 2' described below.

Features relating to a node 1A which may be applied to the other nodes 1B, 1C of the acquisition system 1 are described below.

Sensor System

Figure 3:
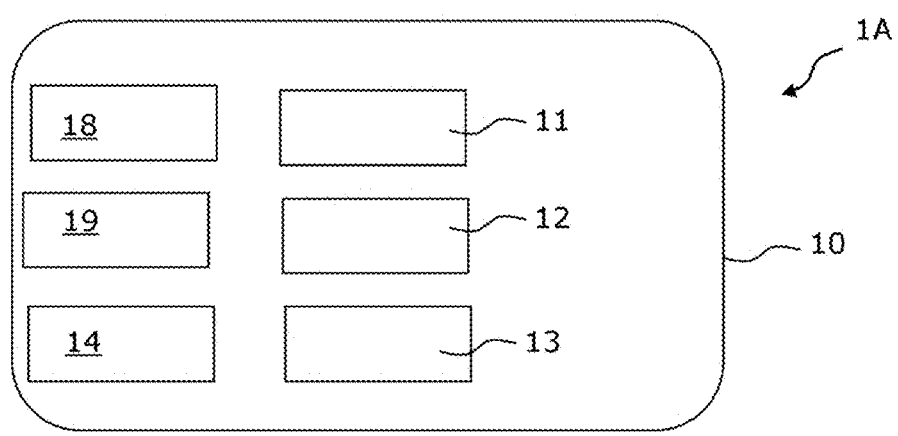
FIG. 3 is a simplified schematic view of a node of an acquisition system of a system for generating and collecting data according to one embodiment of the invention.

As schematically shown in FIG. 3, the node 1A comprises a sensor system 18 which includes at least one vibration sensor (also called an acoustic sensor) which preferably comprises an accelerometer. The sensor system makes it possible to acquire vibration signals corresponding to the vibration background noise of the structure. Advantageously, these vibration signals are detected regularly by the sensor system and according to instructions received by the node as explained below.

The or each vibration sensor acquires vibration (or acoustic) signals which are converted into digital data by an analogue-to-digital converter, which may be integrated into or connected to the vibration sensor. The digital data are saved in a memory of the node, preferably in the form of files, to form vibration data intended for transmission to the gateway system. The vibration data may be raw data corresponding to the digitization of the vibration signals acquired, or may be "processed" data which have undergone processing, for example to remove parasitic noise. Thus, the vibration data may or may not undergo processing steps before being subsequently collected. The collection of the data may be performed using a gateway system as explained below.

Preferably, the sensor system comprises three vibration sensors arranged so as to form a right-angled triangle. This set of three vibration sensors may take the form of a QuietSeis (registered trademark) card produced by Sercel.

According to one particular aspect, the or each vibration sensor is a digital sensor, for example a micro-machined accelerometer or MEMS-based digital accelerometer. The digital sensor is configured to acquire the vibration signals and perform an analogue-to-digital transformation on the vibration signals in order to obtain digital data which are then stored in a data storage memory of the node.

Radiocommunication Modules

As illustrated in FIG. 3, the node 1A also comprises a driver unit 11 and a plurality of radiocommunication modules 12, 13. A first radiocommunication module 12 is configured to communicate with the gateway system 2, 2' using a first radiocommunication protocol in order to make it possible to receive a signal TL21 transmitted by the gateway system 2, 2'. A second radiocommunication module 13 is configured to communicate with the gateway system 2, 2' using a second protocol, distinct from the first protocol, in order to transmit an activity instruction request signal TW12, receive an activity instruction TW21 (or task), for example an acquisition activity, and transmit vibration data Dvib.

The node 1A also includes an internal power source 14, such as single-use cells, preferably lithium cells. As a variant, provision may be made to use one or more batteries.

The driver unit 11 comprises one or more processors allowing the execution of one or more computer programs, for example to launch a phase of acquiring vibration signals by means of the sensor system in order to generate vibration data. The node 1A comprises a data storage memory in which the data relating to the vibration signals acquired are saved and which may form part of the driver unit 11 or be separate.

The node 1A also comprises a radiocommunication module, preferably combined with the second communication module 13, which allows the node to communicate with at least one of the other nodes, preferably a neighbouring node, such as the node 1B, of the acquisition system 1. The radiocommunication between nodes is illustrated in FIG. 1 which shows the transmission of vibration data Dvib from the node 1B to the node 1A, as explained below.

In particular, the second radiocommunication protocol used by the second radiocommunication module 13 is preferably a protocol that allows the nodes of the acquisition system 1 to be able to communicate stepwise, and thus to allow a node to be able to communicate with at least one neighbouring node and/or with a radiocommunication gateway of the gateway system 2, 2'. As a variant, provision could be made for the second protocol used by a node to transmit the vibration data to the gateway to be distinct from the protocol used to communicate between two nodes.

The energy consumption of the first radiocommunication protocol is lower than that of the second radiocommunication protocol and, preferably, the range of the first radiocommunication protocol is greater than that of the second radiocommunication protocol.

According to one particular aspect, the first radiocommunication protocol is a LPWAN (for low-power wide area network) protocol, preferably a LoRaWAN (for long-range wide area network) protocol, also commonly called LoRa (for long-range). More specifically, the LoRaWAN protocol is a communication protocol for the Internet of Things which uses a spread-spectrum modulation technique called LoRa. The first radiocommunication module 12 may thus be formed by a LoRa chip including a processor which may be considered as forming part of the driver unit 11.

Preferably, the second radiocommunication protocol has a bit rate that is faster than the bit rate of the first radiocommunication protocol. The second protocol is preferably a Wi-Fi protocol, and in particular a mesh Wi-Fi protocol. The second radiocommunication module 13 may thus comprise a Wi-Fi chip including a processor which may be considered as forming part of the driver unit 11.

In the example illustrated in the figures, the second protocol is of mesh Wi-Fi type in order to allow each node 1A, 1B, 1C to communicate with a neighbouring node, or with the gateway system for a neighbouring node of the gateway system, in order to transmit thereby the generated vibration data stepwise up to the gateway system 2, 2' which collects them.

In the embodiments presented below, the first communication protocol is of LoRaWAN type and the second communication protocol is of Wi-Fi type, in particular mesh Wi-Fi type, but other communication protocols may be used for the first and second communication protocols. In particular, the chips used may implement other communication protocols.

The node 1A may include a GNSS chip configured to receive a reference clock datum. However, the GNSS chip may not be operational if the node 1A is located beneath the structure. In this case, it may be useful to make provision for the gateway system, preferably located nearby but in an area in which it is not masked by the structure, to be provided with a GNSS chip allowing it to synchronize its internal clock and to transmit a corresponding datum for the synchronization of the internal clocks of the nodes of the acquisition system.

The driver unit 11 may comprise a processing module configured to process the raw vibration data delivered by the sensor system before their transmission to the gateway system 2, 2'. This processing (or preprocessing) may also be performed in the gateway system 2, 2' instead or in addition.

The processing may include filtering (removal of parasitic noise) and/or compression of the data delivered by the sensor system in order to limit the volume of data transmitted and to simplify their use in a remote server system 3, 3' presented below.

Housing

The node 1A comprises a housing 10 which houses the components of the node and which is preferably sealtight.

Preferably, the housing 10 is devoid of any physical input/output connectors. According to one particular aspect, the housing 10 is provided with an LED linked to a circuit board of the housing in order to allow the operating state of the node to be identified discreetly.

The node 1A comprises one or more antennas allowing communication using the different communication protocols chosen. Provision may be made for an antenna to be common to communication using different radiocommunication protocols or for a distinct antenna to be provided per radiocommunication protocol.

The or each antenna is preferably integrated into the housing 10. The absence of an external antenna makes it possible to limit the risk of the node deteriorating and allows the node to have a discreet visual appearance, without attracting attention.

As schematically shown in FIG. 3, the housing 10 houses a magnetic switch 19 for stopping and starting the electrical power supply circuit for the node which is actuable from the exterior of the housing 10 via a magnet in order to switch it to an open or closed state. The absence of a switch on the exterior of the housing makes it possible to limit the risk of an unauthorized third party acting on the node.

As described in detail below, the node 1A is configured to, in the closed state of the switch 19, preferably after an initialization phase allowing parametrization thereof, be asleep or on standby for most of the time so as to afford several years of autonomy, for example of the order of five years, while allowing the gateway system 2, 2' to control the node 1A so as to wake it up in order to perform a particular activity, such as an operation of acquiring vibration signals.

As explained below, the node 1A may enter a sleep mode in which the LoRa chip and the Wi-Fi chip are switched off so that the energy consumption of the node is very low. Still, an internal clock circuit of the node remains active so as to be able to trigger listening phases corresponding to a standby mode.

In standby mode, the LoRa chip is activated while the Wi-Fi chip remains off, which makes it possible to limit energy consumption while allowing the node to receive instructions from the gateway system 2, 2'. The node 1A may also enter an initiated mode in which the Wi-Fi chip is activated so as to allow the node to perform activities requiring more computing resources than those performed in standby mode, such as communication with the gateway system at a higher bit rate and launching an activity such as a phase of acquiring vibration signals.

As recalled above, the features presented for the node 1A are also applicable to the other nodes 1B, 10 of the acquisition system 1.

Each node of the acquisition system is thus autonomous for a long period by virtue of the use of an internal power source and the use of wireless communication technologies driven so as to require only low energy consumption.

The acquisition system 1 is thus easy to install indefinitely on the structure since, once the system has been deployed, the operator will no longer need to act physically thereon for a long period.

Each node is considered to be smart in its ability to be asleep or on standby for most of the time and to wake up (or start) on receiving a particular signal, in particular in order to launch a phase of acquiring vibration acoustic signals.

Gateway System

The gateway system 2, 2' allows communication with the acquisition system 1 in order to control the generation of vibration data and to collect these data. The gateway system 2, 2' also allows communication with a remote server system 3, 3' for, on the one hand, transmitting the vibration data collected which may then be analysed using an operational modal analysis program and, on the other hand, receiving an instruction T32 as schematically shown in FIG. 1 and described in detail below.

The gateway system 2, 2' comprises at least one gateway 2. In the example illustrated in FIG. 1, said gateway system 2, 2' also comprises an additional gateway 2'. The presence of an additional gateway makes it possible to benefit from operational reliability by virtue of the possibility of identifying a malfunction in one gateway by comparing the signals transmitted by the gateways. Thus, a transmission problem between the server system and one gateway may be detected by the acquisition system 1 which then no longer receives the same information from both gateways, one having received a new instruction from the remote server system, which the other gateway has not received. The acquisition system may then decide to consider only the signals received from the up-to-date gateway. Throughout the rest of the description, reference is made to the gateway 2 and the corresponding features are also applicable to the gateway 2'. Reference is also made to communication of the gateway 2 with the nodes 1A and 1B and communication of the gateway 2' with the node 1C. Provision may be made for the gateway system to comprise just one gateway. According to various embodiments, the or each gateway 2, 2' may communicate with each of the nodes using either or both of the protocols directly or indirectly.

The gateway 2 is arranged on or close to the structure 100 to be monitored so as to be able to communicate with the acquisition system 1. Preferably, the gateway 2 is located in an open area allowing a GNSS signal 8 to be picked up.

Thus, the gateway 2 preferably comprises a GNSS device configured to receive a reference clock datum and thus allow its internal clock to be synchronized.

The gateway 2 allows communication with the nodes 1A, 1B and a server 3 of the remote server system 3, 3'. In particular, the gateway 2 allows the collection of the vibration data Dvib delivered by the nodes 1A, 1B of the acquisition system 1. The gateway 2 further allows the transmission of these data to the remote server 3. Similarly, the gateway 2' allows communication with the node 1C and a server 3' of the remote server system 3, 3'. The server 3' may be the same as the server 3. The vibration data Dvib may be used for the operational modal analysis of the structure.

Figure 4:
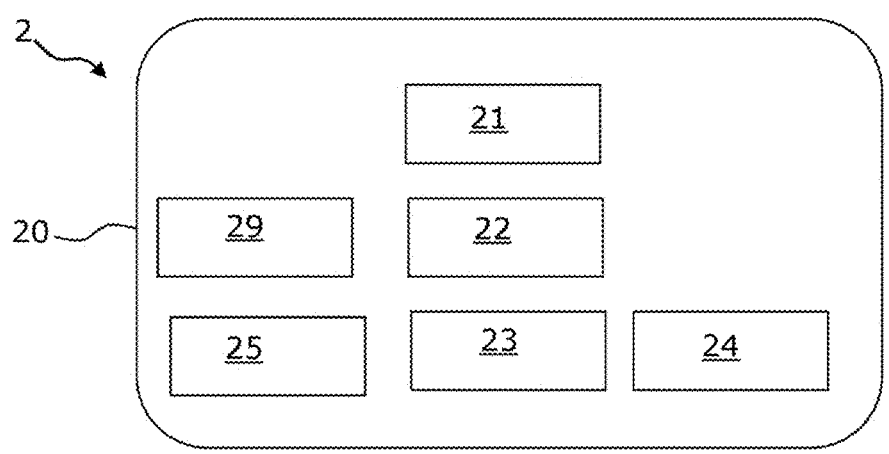
FIG. 4 is a simplified schematic view of a gateway of a system for generating and collecting data according to one embodiment of the invention.

As illustrated in FIG. 4, the gateway 2 comprises a driver unit 21 and radiocommunication modules 22, 23, 24.

A first radiocommunication module 22 is configured to communicate with the nodes 1A, 1B using the first protocol in order to transmit a signal TL21 (or TL21rvl as explained below) to them. The first radiocommunication module 22 is preferably a LoRa chip including a processor which may be considered as forming part of the driver unit 21.

A second radiocommunication module 23 is configured to communicate with the acquisition system 1 in order to collect the vibration data Dvib generated by the nodes 1A, 1B.

A third radiocommunication module 24 is configured to communicate with the remote server 3 in order to transmit the vibration data Dvib collected and in order to receive an instruction signal T32.

The gateway 2 also comprises an internal power source 25, preferably a single-use source, such as single-use cells, preferably lithium cells. As a variant, one or more batteries may be provided. According to one particular embodiment, provision may also be made for the gateway to be provided with a system for connection to an external power supply.

According to one particular embodiment, provision may be made for the gateway to also include a vibration sensor system, which may comprise one or more vibration sensors like for each node. The gateway may thus provide a vibration data acquisition function like each node and then be considered as being a node of the acquisition system in addition to its gateway function with the remote server system.

The second radiocommunication module 23 is configured to communicate with the acquisition system 1 using the second protocol, which is preferably the same protocol as that used by the nodes of the acquisition system 1 to communicate with one another stepwise. Thus, in the example illustrated in the figures, the second protocol is of mesh Wi-Fi type. The second radiocommunication module 23 may thus be a Wi-Fi chip, in particular configured to operate using the mesh Wi-Fi protocol, including a processor which may be considered as forming part of the driver unit 21.

Figure 2:
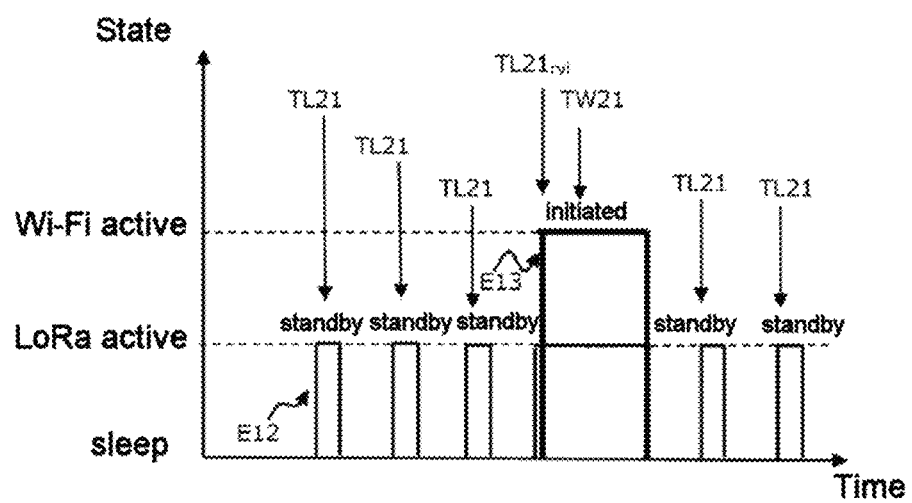
FIG. 2 is a graph illustrating the operating state of the LoRaWAN and Wi-Fi radiocommunication modules of a node of an acquisition system of a system for generating and collecting data according to one embodiment of the invention.

The first radiocommunication module 22 periodically transmits a signal, for example every 15 minutes. This signal is generally denoted by TL21 when it does not contain any wake-up instruction and TL21rvl when it comprises a wake-up instruction (FIGS. 1 and 2). Advantageously, each of the nodes of the acquisition system which receives this signal adjusts the time of opening of a next listening window according to the signal, for example according to a timestamp datum included in the signal, so as not to miss the next signal transmission, while allowing the node to return to a sleep mode between two listening phases in order to limit the energy consumption of the node. In other words, each node uses the instruction signal, the period of transmission by the gateway 2 of which is known, in order to synchronize the next listening window with the transmission of the next instruction signal.

This process allows each node to readjust its listening window, even if an internal clock drift should occur. Each node may thus remain asleep out of listening times while ensuring that a listening window is open when the gateway system transmits an instruction signal.

As illustrated in FIG. 2, when the signal comprises a wake-up instruction (the signal is then denoted by TL21rvl in this case), then the node which has received the signal TL21rvl switches to initiated mode in which the Wi-Fi communication of the Wi-Fi chip 12 is activated (started), as is a processor of the driver unit 11 which executes a computer program to transmit a signal TW21 (see FIG. 1) so as to request an activity instruction TW21 from said gateway 2 (directly or by going through an intermediate node). The program allows the execution of the operations corresponding to the activity instruction received.

When said activity instruction TW21 is an acquisition instruction, the driver unit of each node concerned by said acquisition instruction drives the acquisition of vibration signals by means of the sensor system and the generation of corresponding vibration data Dvib.

The vibration data Dvib, potentially after processing (by filtering parasitic noise), are transmitted stepwise, from the node 1B to the node 1A in the example illustrated in FIG. 1, and then to the gateway 2 which saves them in a data storage memory. Similarly, the vibration data generated by the node 1C are transmitted to the gateway 2'.

According to one particular embodiment, the signal TL21 or TL21rvl sent by the gateway system using the first protocol (LoRaWAN) comprises:

an identifier of the structure associated with the generation and collection system (to avoid this signal being taken into account by nodes of another system associated with another, neighbouring structure);

a timestamp datum, for example the absolute time of day;

a parametrization datum corresponding to an operation of the acquisition system according to a desired parametrization.

When this parametrization datum is recognized by the one or more nodes of the acquisition system which receive the signal, then the signal received is interpreted by the nodes as a simple synchronization signal which is used to readjust the listening window and the parametrization datum of which is used to select the corresponding predefined parametrization of the one or more nodes. The signal is then considered as not containing a wake-up instruction.

When this parametrization datum is not recognized by the one or more nodes of the acquisition system 1 which receive the signal, then this unrecognized parametrization datum is interpreted as being a wake-up instruction such that, as explained above, the node starts a main processor and communication using the second protocol (mesh Wi-Fi) in order to request, from the gateway system, an activity instruction TW21 which may be a vibration signal acquisition instruction.

Advantageously, the signal received which comprises the wake-up instruction is also used to readjust the listening window.

The communication module 24 allows the gateway 2 to communicate with the remote server 3 using a third radiocommunication protocol, which is preferably distinct from the first and second protocols used by the gateway to communicate with the nodes and from the protocol used by the nodes to communicate with one another. According to one particular aspect, the third protocol for communication of the gateway 2 with the server 3 is a long-range protocol, preferably of cellular type, with low energy consumption.

The third radiocommunication protocol is, for example, a mobile telephone network, preferably suitable for the Internet of Things. The third protocol for communication with the server 3 may thus be an LTE-M protocol, and the communication module 24 may then be an LTE-M chip.

Thus, the gateway 2 may transmit the vibration data collected to the remote server 3 using the radiocommunication module 24.

As recalled above, the vibration data Dvib collected by the gateway 2 may be processed by the gateway 2 before transmission to the remote server 3. In particular, provision may be made for the driver unit of the gateway 2 to comprise a processing module configured to calculate data corresponding to damage indicators and to modal parameters.

The gateway 2 may receive, from the remote server 3, instructions comprising, in particular, node parametrization instructions and/or acquisition triggering instructions. The instructions received from the server 3 may further comprise instructions for parametrization of the gateway 2.

Similarly to the nodes, the gateway comprises one or more antennas allowing communication using the different communication protocols chosen. Provision may be made for an antenna to be common to communication using different radiocommunication protocols or for a distinct antenna to be provided per radiocommunication protocol.

According to one particular aspect, provision may be made for, unlike the nodes, the or each antenna to be located on the exterior of the housing 20 of the gateway. As a variant, provision may be made for said or each antenna to be integrated into the interior of the housing.

According to one particular aspect, the gateway 2 also comprises a humidity sensor and/or a temperature sensor.

Advantageously and similarly to the nodes, the gateway comprises a magnetic switch 29 that is activatable via a magnet which is housed in the housing and which an operator may activate using a magnet.

According to one particular aspect, the gateway system transmits, to the nodes of the acquisition system, signals TL21 more frequently than the signals TL21rvl comprising a wake-up instruction, for example to launch an operation of acquiring vibration signals by means of the acquisition system 1, which bring about activation of the Wi-Fi chip.

Such a configuration makes it possible to retain sufficient autonomy for the system for generating and collecting data, while benefiting from good operating performance of the system for generating vibration data of use in verifying the state of the structure.

Thus, while the second protocol (Wi-Fi or mesh Wi-Fi in the example illustrated in the figures) consumes more energy than the first protocol (LoRaWAN in the example illustrated in the figures), the use of communication using this second protocol remains time-limited to carrying out particular activities, including the collection of the vibration data generated, while the first protocol (LoRaWAN), the energy consumption of which is low, is used to transmit signals from the gateway system to the nodes of the acquisition system 1 when said nodes are on standby.

Remote Server System

The remote server system comprises one or more servers 3, 3' with which the gateway system 2, 2' may communicate as explained above. In the example illustrated in FIG. 1, the remote server system comprises a server 3 with which the gateway 2 communicates and a server 3' with which the gateway 2' communicates. The gateway system 2, 2' thus makes it possible to provide the remote server system 3, 3', and therefore a remote user, with data relating to the signals acquired by the nodes 1A, 1B, 1C, which data have potentially been processed.

The vibration data transmitted by the gateway system to the remote server system may be analysed using an analysis program which may be executed, for example, by the remote server system or by a distinct processing unit.

The analysis program may be configured to provide data relating to the state of the structure which are obtained on the basis of the data collected. The analysis program may thus provide indicators, such as grades from 1 to 10, according to the results of an operational modal analysis performed on the basis of the data collected, so that the user can decide whether an intervention on the structure is necessary.

According to one particular aspect, the remote server system hosts a program for managing the system for collecting and generating data, which comprises a user interface allowing a user to define instructions T32 intended for the gateway system and/or for the acquisition system. Thus, provision may be made for a user connected to the remote server system to be able to define, remotely, parameters or activities for the gateway system or the acquisition system.

The instructions T32 may thus comprise parametrization instructions for the gateway system 2, 2' and/or parametrization or operating (activity) instructions to be transmitted to the acquisition system 1.

The instructions transmitted to the acquisition system comprise, for example:

an instruction for the acquisition system 1 to operate in "normal" mode corresponding to an instruction for weekly acquisition with a duration of 20 minutes (per week); or an instruction for the acquisition system 1 to operate in "emergency" mode corresponding to an instruction for acquisition with a duration of 20 minutes per hour for 24 hours (preferably as soon as said instruction is received by the nodes).

The instructions received by the acquisition system 1 may concern all of the nodes or only some of the nodes.

Example of Operation

Figure 5:
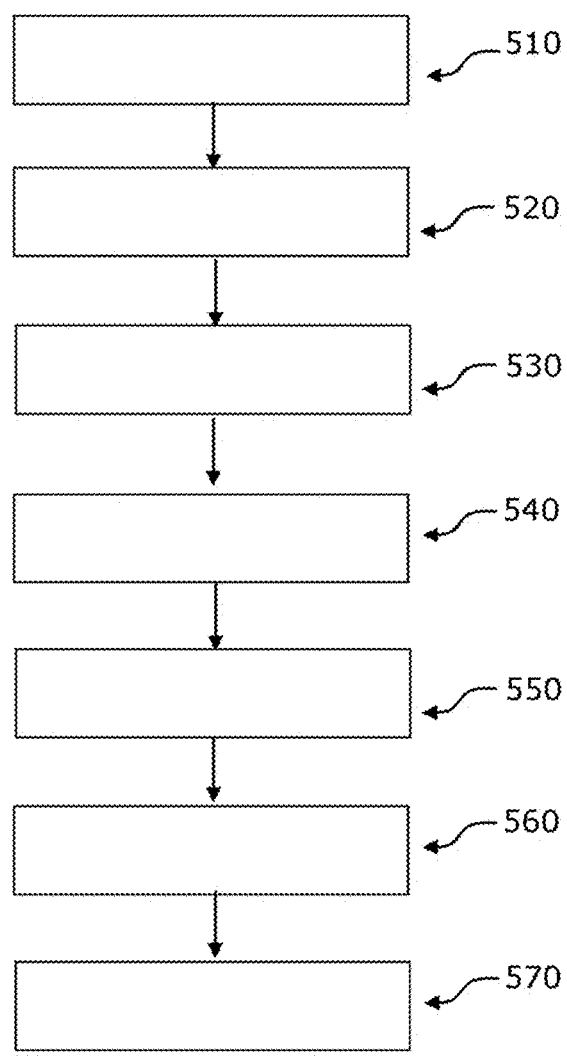
FIG. 5 is a block diagram showing several steps of a monitoring method according to one embodiment of the invention.

With reference to the figures and in particular to FIG. 5, what is proposed below is an example of a method for generating and collecting vibration data with a view to determining the state of a structure 100. In this example, the structure is a bridge but it could be any other type of structure.

In step 510, the nodes 1A, 1B, 1C are deployed by being attached to the bridge according to a predefined plan corresponding to various positions on the bridge, for example every five metres. The gateway 2 and the gateway 2' are positioned on or close to the structure so as to be able to communicate with the nodes 1A, 1B and with the node 1C, respectively. As recalled above, provision may be made for one or each gateway to communicate directly with a node or via another node. Provision may also be made for the gateway system to comprise only one gateway and for this gateway to be able to communicate directly or indirectly with the nodes.

To start with, an operator switches on the gateways and the nodes using a magnet as explained above.

Using a portable terminal 9 (FIG. 1), such as a smartphone provided with a computer application, the operator may carry out an initial parametrization of each node and of each gateway, for example via Wi-Fi.

Provision may thus be made for the radiocommunication module 13, 23 (Wi-Fi) of each node and of each gateway to be activated on switch-on, and for the Wi-Fi communication module 13 to be switched off after the initial parametrization and/or after a certain time.

In particular, after an initial parametrization step, each node 1A, 1B, 1C may return to a sleep mode in which the radiocommunication modules 12 (LoRaWAN) and 13 (Wi-Fi) are off, while an internal clock circuit of the node, forming, for example, part of the driver unit 11, allows, once a given period has elapsed, the activation of the radiocommunication module 12 (LoRaWAN) in order to trigger the opening of a listening window.

The nodes 1A, 1B thus periodically receive a signal TL21, TL21rvl from the gateway 2. Likewise, the node 1C periodically receives a signal from the gateway 2'. As explained above, the time of opening of the next listening window may be adjusted according to time of reception of the signal received.

The example of FIG. 2 illustrates, for a given node, such as the node 1A, the opening over time of a plurality of listening windows corresponding to a transition from sleep mode to standby mode following the activation E12 of the LoRaWAN radiocommunication module 12 so as to be able to receive signals TL21 from the gateway 2 using the LoRaWAN protocol. If the signal TL21 does not contain a wake-up instruction, which is the case for the three first signals received illustrated in FIG. 3, the node 1A returns to sleep mode at the end of the listening window with the deactivation of the LoRaWAN radiocommunication module 12, the Wi-Fi radiocommunication module 13 also staying deactivated.

When, in step 520, the signal TL21rvl transmitted by the gateway contains a wake-up instruction, as is the case of the signal denoted by TL21rvl received by the node 1A in the example illustrated in FIG. 2, the node 1A switches from standby mode to initiated mode, with the activation E13 of the Wi-Fi radiocommunication module 13.

According to one particular aspect, the node 1A also starts a processor, forming part of the driver unit 11, which may be integrated into a chip, such as the Wi-Fi chip, with the Wi-Fi communication module in order to execute a computer program allowing Wi-Fi communication with the gateway or another node and operations to be performed, such as the parametrization of the node 1A or the execution of a vibration signal acquisition activity.

In step 530, the node 1A then transmits an activity instruction request to the gateway 2. Provision may be made for each node to transmit an activity instruction request or for only some of the nodes to transmit an activity instruction request and for the activity instruction received to comprise instructions for each node.

In response to the transmission of the activity instruction request, the gateway 2 transmits, in step 540 using the second protocol (mesh Wi-Fi), an activity instruction signal TW12. When the activity instruction signal TW12 comprises an acquisition instruction, the driver unit 11 of the node 1A triggers, in step 550, a vibration signal acquisition operation by activating the sensor system and generates vibration data on the basis of the vibration signals acquired.

In step 560, the vibration data generated by the node 1A are then transmitted using the second protocol to the gateway system 2, 2'.

The description given for the node 1A may be applied to the other nodes 1B, 10 of the acquisition system. To recall, the description given for a communication between the gateway 2 and the nodes 1A, 1B also applies to the communication between the gateway 2' and the node 1C.

According to one particular aspect, the node 1B transmits, to the node 1A, the vibration data generated and the node 1A retransmits them, along with the vibration data that it has generated, to the gateway 2.

In step 570, the gateway 2 which has collected the vibration data from the nodes 1A, 1B may transmit them to the server 3, potentially after processing, which may comprise compression, filtering of parasitic noise or other operations.

As illustrated in FIG. 2, after an acquisition activity which has resulted in the collection of the vibration data by the gateway 2, the node 1A returns to sleep mode such that its radiocommunication modules 12, 13 are inactive. At the end of a predefined period as explained above and as illustrated in FIG. 2, the internal clock circuit triggers the transition to standby mode by activating the radiocommunication module 12 (LoRaWAN) to open a listening window in order to receive a signal from the gateway.

The energy consumption of a node or of a gateway is preferably of the order of 1 mW.

In order to optimize energy consumption, the nodes of the acquisition system are thus asleep out of the time periods required for the acquisition of vibration signals and for the generation of vibration data, for potential processing of data and for sending this data to the gateway system.

The vibration data collected make it possible to produce a model of the structure which may be updated with the acquisition phases repeated over time, said model being able to be used to analyse the dynamic change in the structure and provide relevant indicators as to the state of health of the bridge over time.

The acquisition phases may thus comprise vibration signal measurements over weeks, for example once a week for a few minutes, for example 20 minutes.

The described functions and steps may be implemented in the form of a computer program or via hardware components (for example programmable gate arrays). In particular, the functions and steps carried out by a driver unit, or a module or a chip, may be performed by sets of instructions or computer modules implemented in a processor or controller or be performed by dedicated electronic components or FPGA or ASIC components. It is also possible to combine computer parts and electronic parts.

Each driver unit takes the form, for example, of a processor and a data storage memory in which computer instructions that are executable by said processor are stored. The term processor should be understood broadly and thus includes a microprocessor.

The driver unit is thus an electronic and/or computer unit. When it is stated that said unit is configured so as to perform a given operation, this means that the unit comprises computer instructions and the corresponding execution means that make it possible to perform said operation and/or that the unit comprises corresponding electronic components.

Advantages

The sensor systems of the nodes of the acquisition system may be off for most of the time, and may be activated according to a given parametrization and when required by the gateway system, thereby limiting energy consumption.

In particular, the use of a first communication protocol of LPWAN type, such as the LoRaWAN protocol, between the gateway system and the acquisition system, allows the nodes to be woken up while allowing, once the nodes have been woken up, the activation of a second communication protocol with a higher bit rate such as a Wi-Fi protocol, preferably the mesh Wi-Fi protocol, which allows the activation of the vibration sensors at certain times only in order to limit energy consumption while benefiting from sufficient communication speed when necessary.

The generation and collection system thus makes it possible to provide a user with useful vibration data relating to the signals which have been measured by high-performance vibration sensors using a smart collection process which allows energy consumption to be limited.

The data collected may be used to carry out an operational modal analysis of the structure, which allows the change with time of the dynamic characteristics of the structure to be monitored. According to one particular aspect and for a structure such as a bridge, modal frequencies lower than 50 Hz are sought. The results of the operational modal analysis of the structure may be indicative of a future failure or a structural pathology and allow the provision of simple indicators of the health of the structure.

Such a design makes it possible to obtain an autonomous collection system with low consumption while benefiting from reliable and effective operation by virtue of the use of adapted data transmission protocols.

Such a design for the system for generating and collecting data makes it possible to benefit from autonomous operation for several years wirelessly, which facilitates maintenance thereof.

By virtue of the data generated and collected using the system according to the invention, it is possible to carry out an operational modal analysis of the structure, which provides, among other advantages:

an overall dynamic analysis of the internal and external state of health of the structure;

simple and unintrusive operational implementation since it does not require an external power source and or any interruption in the use of the structure; and the possibility to deduce, through advanced processing of the data collected, the dynamic characteristics of the structure, such as resonant frequencies, mode damping, and modal shapes.

The invention is not limited to the embodiments illustrated in the drawings.

In addition, the term "comprising" does not rule out other elements or steps. In addition, features or steps that have been described with reference to one of the embodiments disclosed above may also be used in combination with other features or steps of other embodiments disclosed above.

The invention claimed is:

1. A system for generating and collecting data with a view to determining the state of a structure,
the system for generating and collecting data comprising:
an acquisition system comprising devices for acquiring vibration signals, referred to as nodes, said nodes being suitable for being distributed at multiple locations on the structure, said nodes being configured to acquire vibration signals and generate vibration data relating to the vibration signals acquired;
a communication gateway system configured to communicate with the acquisition system using a first radiocommunication protocol to transmit a signal to the acquisition system;
wherein the communication gateway system is configured to communicate with the acquisition system using a second radiocommunication protocol, the energy consumption of which is higher than that of the first radiocommunication protocol, to collect the vibration data generated by the acquisition system;
and the acquisition system is configured to:
receive the signal from the gateway system, using the first protocol, and when the signal comprises a wake-up instruction,
send the gateway system an activity instruction request signal using the second protocol,
receive, from the gateway system, using the second protocol, an activity instruction signal comprising an acquisition instruction,
trigger a vibration signal acquisition operation and generate vibration data on the basis of the vibration signals acquired; and
transmit, using the second protocol, the vibration data to the gateway system.

2. The system according to claim 1, wherein said gateway system being configured to periodically transmit the signal using the first protocol, the acquisition system is configured to, in the open state of a listening window, receive said signal and to define the time of triggering of the opening of a next listening window according to the signal received.

3. The system according to claim 1, wherein the acquisition system is configured to:
between the end of one listening window and the triggering of the opening of the next listening window, be in a sleep mode, wherein communication using the first protocol and communication using the second political are deactivated;
when triggering the opening of a listening window, switching to a standby mode, in which communication using the first protocol is activated, while communication using the second protocol remains inactivated; and
when receiving a signal comprising a wake-up instruction, switching to an initiated mode, in which communication using the second protocol is activated.

4. The system according to claim 1, wherein the acquisition system is also configured to:
receive, from the gateway system, an activity instruction signal which comprises a parametrization instruction signal, and
modify at least one operating parameter of the acquisition system.

5. The system according to claim 1, wherein said at least one operating parameter of the acquisition system that is modified is the duration of an acquisition of vibration signals and the frequency of triggering of the acquisition operation.

6. The system according to claim 1, wherein the gateway system is configured to communicate with a remote server system using a third radiocommunication protocol to transmit, to the remote server system, the vibration data collected, and to receive, from the remote server system, instruction data comprising gateway system parametrization instructions or parametrization or activity instructions to be transmitted to the acquisition system.

7. The system according to claim 1, wherein the first radiocommunication protocol has a range greater than that of the second protocol.

8. The system according to claim 1, wherein the second radiocommunication protocol has a bit rate that is faster than the bit rate of the first communication protocol.

9. The system according to claim 6, wherein the first protocol is a long-range wide area network protocol, the second protocol is a mesh Wi-Fi protocol, and the third radiocommunication protocol is a communication protocol for the Internet of Things.

10. The system according to claim 1, wherein the nodes of the acquisition system are configured to communicate with one another using a radiocommunication protocol, allowing each node to transmit data to a neighbouring node.

11. The system according to claim 1, wherein each node comprises a housing devoid of any external connector or external antenna.

12. The system according to claim 1, wherein each node or the gateway system comprises a housing and a magnetic switch for controlling the stopping and starting of said node or of said gateway system, said magnetic switch being included in the housing and actuable from the exterior of the housing via a magnet.

13. The system according to claim 1, wherein the communication gateway system comprises a first gateway configured to communicate with at least one portion of the nodes, and a second gateway configured to communicate with at least another portion of the nodes.

14. The system according to claim 1, wherein the gateway system comprising one or more gateways, the or each gateway comprises:

a first radiocommunication module, configured to communicate using the first communication protocol with the acquisition system in order to transmit signals thereto;
a second radiocommunication module, configured to communicate using the second communication protocol with the acquisition system in order to receive an activity instruction request signal, transmit an activity instruction and collect the vibration data generated by the acquisition system;
a third communication module, configured to communicate using a third communication protocol with the remote server system in order to transmit the vibration data collected and in order to receive an instruction signal; and
an internal power source.

15. The system according to claim 1, wherein each node of the acquisition system comprises:
a vibration sensor system allowing the vibration signals to be acquired;
a first radiocommunication module, configured to receive, using the first communication protocol, a signal transmitted by the gateway system;
a second radiocommunication module, configured to communicate using the second communication protocol with the gateway system,
an internal power source.

16. A method for generating and collecting data with a view to determining the state of a structure, using an acquisition system and a gateway system, said acquisition system comprising devices for acquiring vibration signals, referred to as nodes, said nodes being distributed at multiple locations on the structure, said nodes being configured to acquire vibration signals and generate vibration data relating to the vibration signals acquired, the method comprising the reception, by the acquisition system using a first radiocommunication protocol, of a signal from the gateway system, wherein, said signal from the gateway system comprising a wake-up instruction, the method comprises the following steps:
the acquisition system transmitting an activity instruction request signal to the gateway system using a second radiocommunication protocol, the energy consumption of which is higher than that of the first radiocommunication protocol;
the acquisition system receiving, using the second radiocommunication protocol, an activity instruction comprising an acquisition instruction from the gateway system;
the acquisition system triggering the acquisition of vibration signals, and generating vibration data on the basis of the vibration signals acquired; and
the acquisition system transmitting, to the gateway system via the acquisition system, using the second radiocommunication protocol, the vibration data generated.

17. The method according to claim 16, wherein the gateway system transmits, to a remote server system, the vibration data received from the acquisition system.

18. The method according to claim 17, wherein the remote server system executes a program for the operational modal analysis of the structure on the basis of the vibration data received and generates, according to the results of the operational modal analysis, information relating to the state of the structure.

19. A device for acquiring vibration signals, referred to as a node, said node being suitable for being positioned at a location on a structure, the node being configured to acquire vibration signals and generate vibration data relating to the vibration signals acquired,
wherein the node comprises a first radiocommunication module allowing communication with the gateway system using a first radiocommunication protocol, in order to receive a signal; and a second radiocommunication module for communication with the gateway system using a second radiocommunication protocol, the energy consumption of which is higher than that of the first radiocommunication protocol, in order to transmit, to the gateway system, the vibration data generated by the acquisition system;
and the node is configured to:
when the signal received using the first radiocommunication protocol comprises a wake-up instruction,
send the gateway system an activity instruction request signal using the second radiocommunication protocol,
receive, from the gateway system, using the second radiocommunication protocol, an activity instruction signal comprising an acquisition instruction,
trigger a vibration signal acquisition operation and generate vibration data on the basis of the vibration signals acquired;
transmit the vibration data to the gateway system using the second radiocommunication protocol.

20. A communication gateway system for collecting vibration data generated by an acquisition system with a view to determining the state of a structure, wherein the communication gateway system comprises a first radiocommunication module allowing communication with the acquisition system using a first radiocommunication protocol, in order to transmit a signal to the acquisition system; and a second radiocommunication module allowing communication with the acquisition system using a second radiocommunication protocol, the energy consumption of which is higher than that of the first radiocommunication protocol, in order to collect the vibration data generated by the acquisition system;
and the communication gateway system is configured to:
transmit, using the first radiocommunication protocol, a signal that comprises a wake-up instruction;
receive, from the acquisition system, an activity instruction request signal using the second radiocommunication protocol;
transmit, using the second radiocommunication protocol, an activity instruction signal comprising an acquisition instruction, so that the acquisition system triggers a vibration signal acquisition operation and generates vibration data on the basis of the vibration signals acquired;
receive said vibration data using the second radiocommunication protocol.

* * * * *